Figure 1:
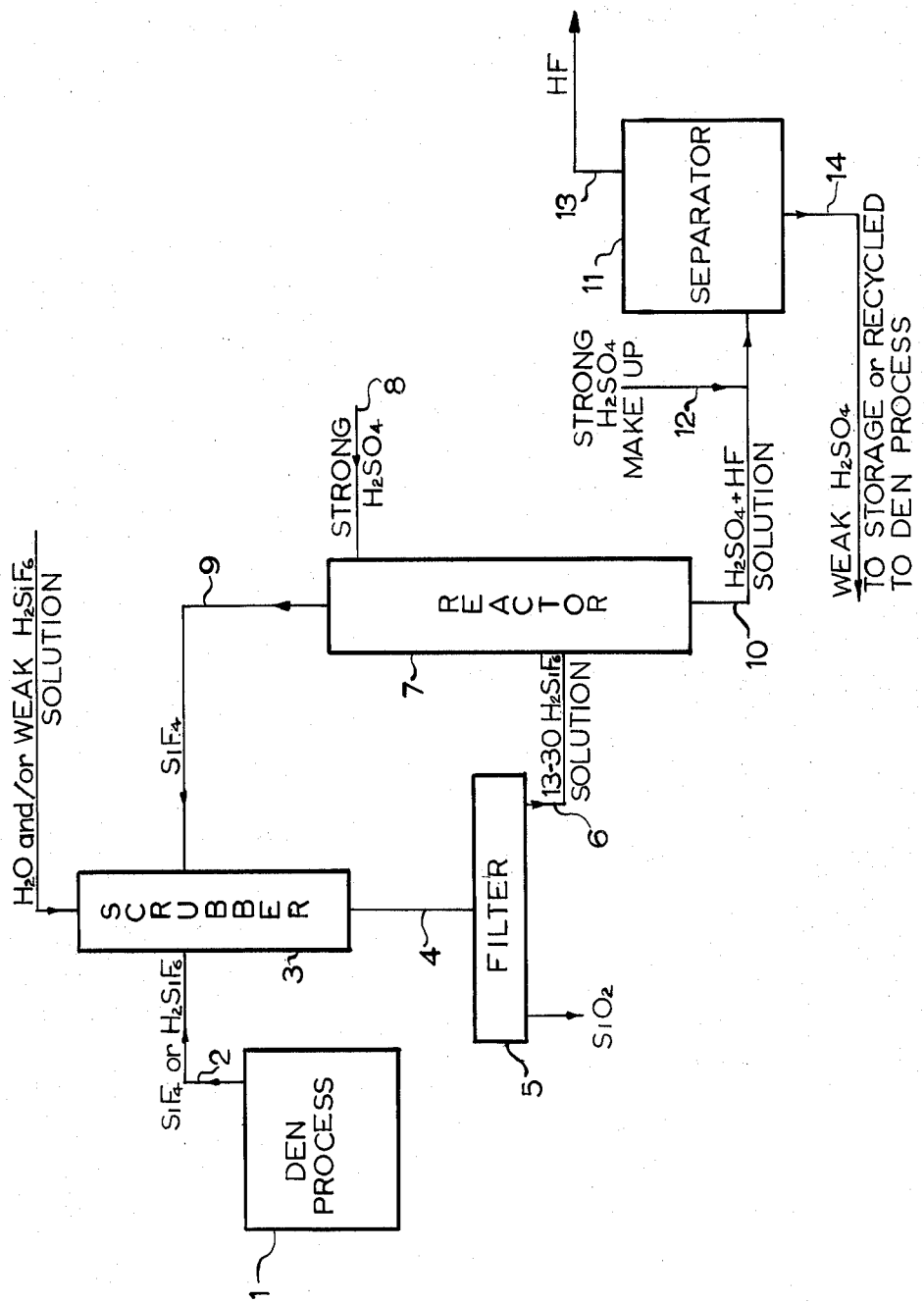

INVENTOR.
MOHR ET AL
BY John P. Hazzard

United States Patent Office 3,257,167
Patented June 21, 1966

3,257,167
PROCESS FOR RECOVERING STRONG HF FROM PHOSPHATE ROCK DIGESTION PROCESSES
Albert C. Mohr and Robert P. Obrecht, Orinda, Ramsey G. Campbell, Berkeley, and Alfred L. Messenger, Richmond, Calif., assignors to Stauffer Chemical Company, New York, N.Y., a corporation of Delaware
Filed Nov. 29, 1963, Ser. No. 328,446
3 Claims. (Cl. 23—153)

This application is a continuation-in-part of application S.N. 142,244 filed October 2, 1961, which in turn is a continuation-in-part of application S.N. 142,245 filed on even date herewith, both applications have been abandoned.

This invention relates to the manufacture of hydrogen fluoride from silicon tetrafluoride, $SiF_4$; fluosilicic acid, $H_2SiF_6$, or the like.

These fluorine containing compounds are troublesome and noxious by-products formed and liberated in various processes, e.g., when a strong mineral acid such as sulfuric acid, phosphoric acid, or nitric acid is applied to phosphate rock to produce phosphoric acid or a phosphate fertilizer such as superphosphate or triple superphosphate; or when phosphoric acid is concentrated; or when glass is etched with hydrofluoric acid.

In accordance with the present invention, the waste silicon tetrafluoride is treated with water to form fluosilicic acid and silica. This may be done as part of the den process or the like and the fluosilicic acid produced routed to the acid production unit.

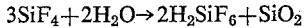

$$3SiF_4 + 2H_2O \rightarrow 2H_2SiF_6 + SiO_2$$

The silica is filtered from the reaction products and the fluosilicic acid is decomposed with sulfuric acid to form hydrogen fluoride and silicon tetrafluoride.

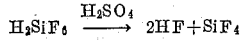

$$H_2SiF_6 \xrightarrow{H_2SO_4} 2HF + SiF_4$$

The hydrogen fluoride is recovered in concentrated form while the silicon tetrafluoride is returned to the process for further treatment or is recovered as such.

The invention has been applied with particular success to the manufacture of hydrogen fluoride from the fluosilicic acid liberated in the den process for the process for the manufacture of single superphosphate and the invention will be described in this connection although it is not limited to that process.

The volatile fluorine compounds formed in the den are extremely toxic in character and are, accordingly, removed from the den by an exhaust blower of considerably capacity. To comply with good public relations and to abate what would be an intolerable air pollution nuisance, the volatile fluorine compounds must be removed from the exhaust air stream before being discharged to the atmosphere. This removal must be almost quantitative in character; for example, it has been found that air containing less than 0.1 part per million by volume of water soluble fluorine compounds (calculated as hydrofluoric acid) is toxic to conifers.

Any process involving the absorption in water of the water soluble fluorine compounds present in the den effluent gas stream produces fluosilicic acid and by-product silica hydrate; existing legal restrictions forbid the direct discharge to the sewer of the raw acid. For example, effluent discharged to the Los Angeles County Sanitary Sewage System must be neutralized to a minimum pH of 6; i.e., all acids present must be neutralized quantitatively. This is obviously a matter of substantial expense.

Another method of disposing of the waste fluosilicic acid now in use involves addition of the effluent liquor from the scrubber either directly to the phosphate rock prior to discharge of the reaction slurry thus formed to the den, or to the phosphate rock in the den immediately after acidification of the rock with sulfuric acid. This method has several undesirable features; if the phosphate rock charge to the den is the so-called "white rock," the superphosphate den product is soupy in character, and requires excessive set-up time to meet customer specifications if fluosilicic acid is added to the rock. The highly corrosive, abrasive character of the reaction mixture of normal rock and fluosilicic acid causes excessive material handling equipment failure. Finally, the fluorine content of the superphosphate den product is increased by the addition of the fluosilicic acid to the phosphate rock.

It is believed obvious from the above that the fluorine content of the phosphate rock utilized in the manufacture of phosphate fertilizers and phosphate acid represents a problem of some magnitude because of the nature of the products involved. A further difficulty is in the relatively large volume of fluorine evolved, essentially as gaseous silicon tetrafluoride; for example, each ton of Western phosphate rock contains from sixty to seventy pounds of fluorine. From 40% to 60% of this is released, essentially as gaseous silicon tetrafluoride. When it is remembered that plants acidulating 500 to 1,500 tons of phosphate rock a day are not uncommon, the size aspect of the problem will be further apparent.

A further difficulty is in supplying sulfuric acid of the strength best suited to acidulation of the rock. Because of the large size of the superphosphate plants, they are usually associated with a captive sulfuric acid plant, usually producing acid by the so-called "contact process." To operate a contact acid plant effectively, it is usually desirable to produce acid at a strength of 93 to 99% $H_2SO_4$. It is generally recognized that it is also desirable to acidulate phosphate rock with weaker sulfuric acid; for example, a strength of 70–80%, usually about 70–75%. Thus, one is faced with an enormous dilution problem which is uneconomical and represents a further loss.

In accordance with the present invention, the fluorine content of the gases liberated upon acid digestion of phosphate rock to produce a phosphate fertilizer or phosphoric acid is recovered as hydrofluoric acid. This can be marketed as such, or can be used for the manufacture of various fluorine containing chemicals. Additionally, the process of the present invention contemplates an economically effective dilution of a stream of strong sulfuric acid to a strength acceptable for use in the acidulation of phosphate rock. Whatever fluorine values are liberated from the phosphate rock are maintained in the operation and the only issuance of fluorine is as hydrofluoric acid. The process of this invention also contemplates the decomposition of fluosilicic acid in the presence of sulfuric acid to form HF and $SiF_4$. The hydrofluoric acid remains in the sulfuric acid solution and the silicon tetrafluoride separates as a gas and is recycled to produce additional fluosilicic acid for use in the process. The hydrofluoric acid is separated from the sulfuric acid solution and the diluted sulfuric acid is either conveyed to storage or directly to the phosphate rock acidulation plant. By-product silica is produced by the present invention and is separated by filtration and may be treated for economic use.

Figure 2:
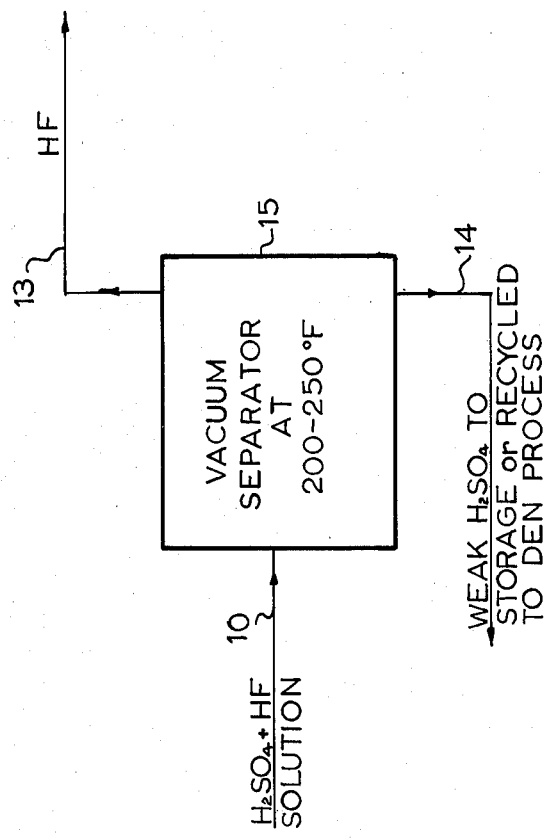
Figure 3:
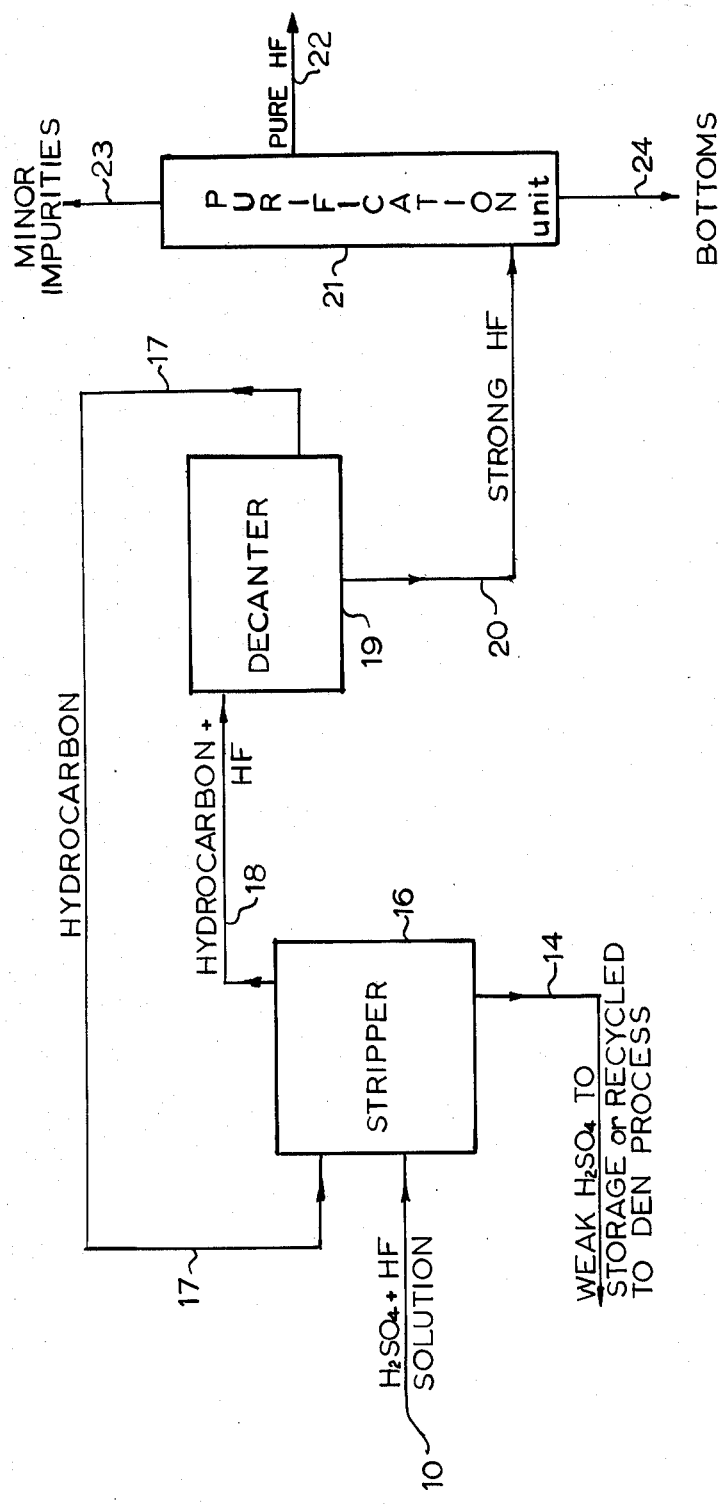

The practice of the present invention will become further apparent from a consideration of the following. In the drawings FIGURE 1 is a general process flowsheet of the present invention, while FIGURES 2 and 3 are flowsheets of processes of separating hydrofluoric acid from dilute HF–$H_2SO_4$ solutions. The apparatus indicated on these flowsheets is merely diagrammatic and all units, e.g., valves, heaters, condensers, etc., have not been illustrated since these will be apparent to those skilled in the art.

Referring particularly to the flowsheet shown in FIGURE 1 of the drawings, gaseous silicon tetrafluoride or fluosilicic acid if the den process utilizes a separate scrubber is evolved in the den process 1 wherein phosphate rock is acidulated with weak sulfuric acid. Other sources of silicon tetrafluoride or fluosilicic acid such as a phosphoric acid digester or the like may be substituted for den process 1 without departing from the scope of the present invention. The silicon tetrafluoride or $H_2SiF_6$ passes through pipe 2 to a scrubber 3. In the scrubber (assuming $SiF_4$ exits the den process) the silicon tetrafluoride is contacted with water or a dilute solution of fluosilicic acid and the following reaction occurs:

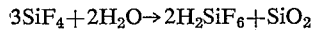

The thus formed slurry of fluosilicic acid, silica and water exits scrubber 3 by way of piping 4 and is carried to a filter 5. Such solution contains up to 5% fluorine. The filter removes the solid silica from the slurry leaving a dilute solution of fluosilicic acid which, as indicated in FIG. 1, may pass through piping 6 to a reactor 7. An alternative in the process at this point, which depends on the economics of a particular plant, is to recycle a portion of the dilute fluosilicic acid solution exiting the filter 5 to the top of scrubber 3 to produce a stronger solution. By varying the ratio of fluosilicic acid recycled, the concentration of fluosilicic acid which is fed to reactor 7 can be varied and thus, the most economic concentration of fluosilicic acid for a given plant can be determined and maintained in a continuous process. Economic evaluation of some plants shows that a 25–30% solution of fluosilicic acid entering the reactor would be most economical and this would require such a recycle step to obtain such a concentration of fluosilicic acid.

In the reactor 7, the fluosilicic acid solution is contacted with strong sulfuric acid which enters the reactor through piping 8. The positioning of piping 8 in FIG. 1 is merely diagrammatic since the strong sulfuric acid may enter reactor 7 at any point and, in fact, the $H_2SiF_6$ and $H_2SO_4$ may be premixed before entering the reactor 7. The fluosilicic acid decomposes in reactor 7 in the presence of sulfuric acid as follows:

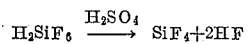

Actually, the concentration of sulfuric acid employed in the reactor 7 may vary widely. However, the final concentration of the sulfuric acid entering the separator must be in the range of 70 to 75% sulfuric acid, said concentration based on all of the water present in the aqueous solution. This required concentration can be regulated by control of the amount and concentration of sulfuric acid entering reactor 7 through piping 8 or the makeup sulfuric acid entering the process via piping 12. Usually, such den process plants have their own captive "contact process" sulfuric acid plants producing 93 to 99% $H_2SO_4$ and such strong sulfuric acid could be fed through piping 8 to reactor 7 with excellent results so long as the concentration of the resulting solution is 70–75% sulfuric acid.

The silicon tetrafluoride and the hydrofluoric acid produced by decomposition of fluosilicic acid in the reactor are separated as the low boiling $SiF_4$ exits the reactor as a gas through piping 9 and is recycled to scrubber 3 and therein produces additional fluosilicic acid, while hydrofluoric acid remains in the liquid phase and exits via piping 10. If any hydrofluoric acid is carried overhead by the gaseous silicon tetrafluoride, it would not be lost to the process even though it would be a negligible amount due to recycle of the $SiF_4$ to the scrubber 3. If it be desired to reduce or substantially eliminate the exiting of HF with $SiF_4$ from the reactor, the reactor may be operated under a positive pressure which would tend to keep the HF in the liquid phase. An alternative method would be to contact the effluent gas from reactor 7 with concentrated sulfuric acid which would strip HF from the gaseous $SiF_4$. The sulfuric acid thus used could then be used as a reactor feed.

The remaining $H_2SO_4$, HF, and $H_2O$ solution in the reactor 7 exits the bottom through piping 10 and goes to a separator 11 wherein the hydrofluoric acid is separated and collected via piping 13. Prior to entry into the separator 11, strong sulfuric acid may be introduced through piping 12 into the solution in piping 10 to adjust the concentration of the sulfuric acid if need be. Increasing the acid concentration about 75% results in the production of large amounts of fluosilicic acid, $H_2SiF_6$, which can not be economically separated from the sulfuric acid and completely ruins the economics of the process due to the loss of fluorine values.

When sulfuric acid strengths of less than 70% are used, too high a concentration of fluosilicic acid is left undecomposed to make the process economical and the stripped HF is at too low a concentration. Also the resulting sulfuric acid solution is too dilute for use in the "den process."

After the hydrofluoric acid is removed from the solution in the separator via piping 12, the remaining weak sulfuric acid (70–75%) solution exits through piping 14 to storage or directly to the acidulation step of a den process phosphate rock plant or other use.

Thus far, the final separation of hydrofluoric acid from the sulfuric acid solution has been described merely as boiling off strong hydrofluoric acid in separator 11. This is an oversimplification of the final separation since, as is well known to those skilled in the art, such a solution is not ideal due to strong complexing action of the sulfuric acid in the solution and therefore cannot be readily separated.

Referring to FIG. 2, a vacuum separation is effected as follows. A water solution of hydrofluoric acid and sulfuric acid enters vacuum separator 15 through piping 10. This solution may be as it exits stripper 7 or the sulfuric acid concentration may have been increased by the addition of strong sulfuric acid through piping 12 as previously described with respect to the overall process shown in FIG. 1 of the drawings. This solution may also be preheated, if desired, prior to entry into vacuum separator 15. This vacuum separator maintained at a temperature of from 200 to 250° F. under vacuum. The preferred vacuum is approximately 28" of mercury since the separation efficiency decreases at higher pressures. In the vacuum separator 15, strong HF is vaporized and exits through piping 13 to be condensed and collected or further purified. The remaining weak sulfuric acid exits the vacuum separator via piping 14 and is conveyed to storage or directly to an acidulation step in a den process phosphate rock plant or the like.

FIGURE 3 shows a flowsheet of a hydrocarbon stripping process for removing hydrogen fluoride from a sulfuric acid solution. Here, the solution to be stripped of hydrofluoric acid enters stripper 16 through piping 10. The solution entering stripper 16 via piping 10 may be either at the concentration at which it exits reactor 7 or the solution may have its concentration of sulfuric acid increased by adding strong sulfuric acid via piping 12 as shown in FIG. 1 of the drawings.

In the stripper 16, the acid solution mixes with a hydrocarbon vapor or liquid which enters the stripper through piping 17 and the hydrocarbon vapor and hydrofluoric acid which is stripped thereby exit through piping 18. The heat necessary to effect the vaporization in stripper 16 may be supplied by directly heating the material in the vaporizer, by the enthalpy of the incoming hydrocarbon and sulfuric acid stream, or by a combination thereof. After stripping the hydrofluoric acid, the weak sulfuric acid exits the stripper 16 by way of piping 14 and is handled as previously described with respect to FIGURES 1 and 2.

The hydrocarbon and HF vapors exiting stripper 16 via piping 18 are condensed and form immiscible layers which are separated in decanter 19. The hydrocarbon forms a separate layer which is separated and returned to vaporizer 16 via piping 17. The hydrofluoric acid which forms the other layer in decanter 19 is drawn off by way of piping 20. The hydrofluoric acid, at this point, may be either collected or conveyed to a purification unit 21. By employing such a unit which can be any conventional means, anhydrous hydrofluoric acid may be drawn off via piping 22 and collected.

Any low boiling hydrocarbon which boils up to around 110° C. will suffice as the hydrocarbon used in the separation. Saturated alkanes are the preferred class of hydrocarbons to be employed. Aromatic and olefinic compounds as well as chlorinated hydrocarbons are also to be included in the group of hydrocarbons which will effect the desired separation provided they are not too readily reactive with the concentration of sulfuric acid present in the mixture.

The use of air as a stripping agent is known in the prior art. However, such would not be feasible in the process of the present invention since complete condensation of the hydrofluoric acid would be impractical.

In experimental runs using hexane, a 73% HF was separated by stripping and decantation from a solution containing 75% sulfuric acid and 1.4% fluorine. Other hexanes, pentanes, heptanes and butanes as well as propane were used in experimental runs with equivalent success. Experimental runs using cyclohexane, benzene, Freons, and propylene as the stripping agent were also successful. The use of $SO_2$ as a stripping agent was likewise successful.

The following examples are merely illustrative of the present invention and are not to be construed as limiting the scope of the present invention.

Example 1

172 lb./hr. of 13% fluosilicic acid were fed to a scrubber. This fluosilicic acid-water solution was the reaction product of "den process" silicon tetrafluoride and water. Also entering the scrubber was gaseous $SiF_4$ which was a reaction product from the reaction. Upon contact of the $SiF_4$ and the weak fluosilicic acid in the scrubber, silica and additional fluosilicic acid are produced. This effluent slurry was filtered and the fluosilicic acid of increased concentration was recycled to the scrubber. A portion of the fluosilicic recycle stream was drawn off and conveyed to a reactor. The recycle ratio was controlled so that the acid drawn off for use in the reactor was a 25% solution of $H_2SiF_6$.

The 25% $H_2SiF_6$ solution and 98% sulfuric acid were continuously mixed. The amount of $H_2SO_4$ added was adjusted to give a resultant 70% $H_2SO_4$ concentration. The mixed acids then entered the reactor which consisted of a 6-inch diameter Resistoflex column packed with three feet of ½-inch carbon Raschig rings. $SiF_4$ gas and some HF rise from this column while the acid effluent containing most of the HF passed through a seal leg to the vacuum separator.

The vacuum separator consisted of a 6-foot length of 3-inch Monel chamber with side inlet for the acid solution. The acid maintained at 230° F. overflows through 7/16-inch holes in the 2-inch pipe and flows down the walls of this pipe. The acid solution discharged into the side of a 6-inch Monel chamber 3½ feet long. Vacuum of 28 inches of mercury was developed at the top of this chamber. A seal leg is attached to the chamber which conveys the acid solution which has had HF removed to a receiving tank for acid storage. The gaseous HF effluent from the separator was then conveyed to a condenser and the HF condensed on the discharge side of the vacuum pump.

The HF recovery on this particular run was 12 lb. of 78% HF per hour.

Example 2

An acid solution was stripped by mixed hexanes in a 6-inch distillation column packed with 6 feet of ½-inch carbon Raschig rings. The hydrocarbon and concentrated HF are distilled off, condensed and decanted. The hydrocarbon is then reused and the HF is collected.

The following table represents the results of such run.

Distillation column—
  (1) $H_2SO_4$ in:
    $H_2SO_4$ Rate g.p.m. _____ 0.95
    Strength _____ 75
    Inlet temp. ° F. _____ 190
    Percent HF _____ 1.48
  (2) Hexane vapor in:
    G.p.m. (liquid) _____ 0.5
    Inlet temp. ° F. _____ 220
    Outlet temp. ° F. _____ 220
  (3) $H_2SO_4$ out (bottoms):
    Outlet temp. ° F. _____ 180
    Outlet percent F. _____ 0.19
Decanter—
  (4) HF data:
    Percent recovery _____ 92
    Strength
      Percent HF _____ 73
      Percent $H_2SO_4$ _____ 2.0

Many variations in the present process will be readily apparent to those skilled in the art which would not depart from the scope of the present invention. For example, a series of scrubbers could be used to form higher concentrations of fluosilicic acid. This could be done by forming an $H_2SiF_6$ solution in a primary reactor 1 from the den process effluent and then treating this solution in a final system with strong $SiF_4$ from the reactor. Thus, the scope of the present invention should be limited only as indicated in the appended claims.

Another point of interest is the silica effluent from filter 5 of FIGURE 1 of the drawings. This silica is useful as a rubber extender and as an agriculture chemical carrier. It has an oil absorption characteristic better than any silica currently on the market as it can absorb more than five times its weight in oil and has a bulk density of only 2.8 lb./cu. ft.

We claim:

1. A process for the recovery of fluorine values in the form of strong hydrofluoric acid from a wet process phosphoric acid plant or a phosphate fertilizer plant wherein phosphate rock is digested with about 70 to 80% sulfuric acid and the fluorine values are given off in the form of silicon tetrafluoride and fluosilicic acid, comprising:
   (1) contacting said silicon tetrafluoride and fluosilicic acid with sufficient water to convert all of said fluorine values to weak fluosilicic acid containing less than about 30% fluosilicic acid and precipitating silica,
   (2) filtering the resulting slurry to remove the silica thus formed, leaving a weak fluosilicic acid solution,
   (3) contacting said weak fluosilicic acid solution with strong sulfuric acid in an amount sufficient to yield a 70 to 75% sulfuric acid based on all of the water present in the aqueous solution obtained, said contacting with strong sulfuric acid decomposing the fluosilicic acid to HF and gaseous silicon tetrafluoride,
   (4) recycling said gaseous silicon tetrafluoride to the scrubbing operation of step 1, above, and
   (5) separating the HF from the sulfuric acid at a temperature lower than the boiling point of the mixture at atmospheric pressure so as to obtain a hydrofluoric acid of higher concentration than the HF-water azeotropic composition and a separate sulfuric acid solution having a concentration between about 70 and 80% $H_2SO_4$ suitable for use in digestion of additional phosphate rock.

2. A process as stated in claim 1 wherein the aqueous solution of hydrofluoric acid and sulfuric acid is separated by vacuum distillation.

3. A process as stated in claim 1 wherein the aqueous solution of hydrofluoric acid and sulfuric acid is separated by vapor stripping using a stripping agent which is non-reactive with the mixture and is immiscible with the strong hydrofluoric acid stripped.

References Cited by the Examiner

UNITED STATES PATENTS

| 2,952,334 | 9/1960 | Provoost et al. | 23—153 X |
| 3,004,829 | 10/1961 | Boyle et al. | 23—153 |
| 3,024,086 | 3/1962 | Cines | 23—153 X |

BENJAMIN HENKIN, *Primary Examiner.*

MAURICE A. BRINDISI, *Examiner.*